Patented Feb. 1, 1949

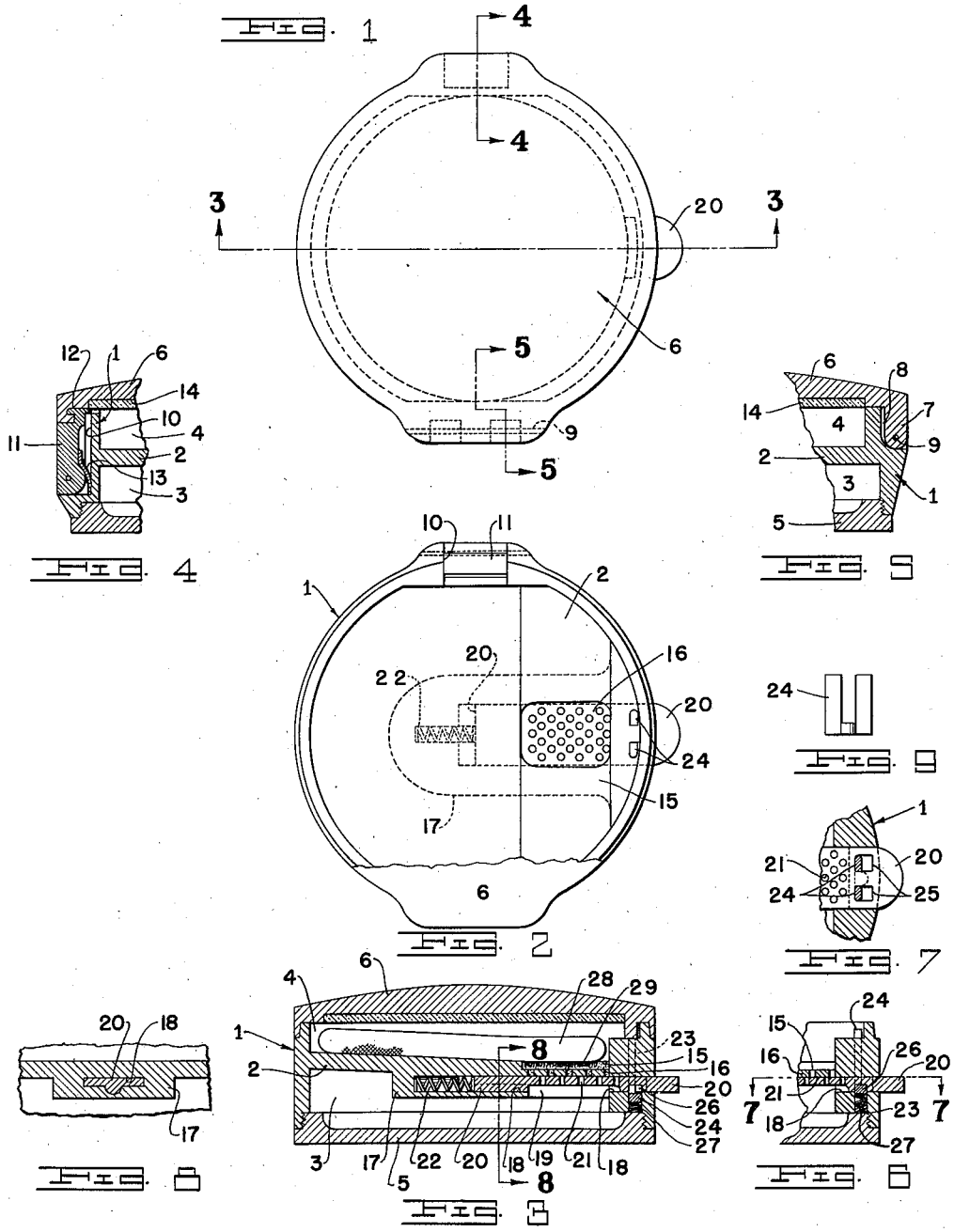

2,460,444

UNITED STATES PATENT OFFICE 2,460,444

FACE POWDER CONTAINER

Lynn Bering, Hollywood, Calif.

Application December 6, 1947, Serial No. 790,191

5 Claims. (Cl. 132—82)

My invention relates to face powder containers or "compacts" and the objects of my invention are:

First, to provide a container for face powder which offers an effective solution to the vexing and often embarrassing spilling of face powder should the compact or container be dropped while in use or, for that matter, at any time; this being accomplished without resort to cake powder, instead the container being arranged to carry loose powder.

Second, to provide a container for face powder which incorporates a powder reservoir and a powder puff compartment separated by a valve controlled perforated compartment so that powder may be transferred as needed, said container also incorporating latching means for the valve so arranged that powder can only be transferred when the container is closed.

Third, to provide a container of this character which is particularly suited for construction from molded plastic parts and is therefore relatively inexpensive of manufacture.

With the above and other objects in view as may appear hereinafter, reference is directed to the accompanying drawings, in which:

Figure 1 is a top or plan view of my face powder container.

Figure 2 is a similar view with the cover broken away to show the interior of the powder puff compartment.

Figure 3 is a sectional view through 3—3 of Figure 1.

Figure 4 is a fragmentary sectional view through 4—4 of Figure 1 showing the lid latch construction.

Figure 5 is a fragmentary sectional view through 5—5 of Figure 1 showing the lid hinge construction.

Figure 6 is a fragmentary sectional view in the plane of Figure 3 showing the valve lock in its locking position when the lid is open.

Figure 7 is a fragmentary sectional view through 7—7 of Figure 6.

Figure 8 is a fragmentary sectional view through 8—8 of Figure 3.

Figure 9 is an elevational view of the valve locking member.

My face powder container includes a body 1 preferably molded of plastic material. The body 1 may be cylindrical in form and provided with a partition 2 which divides the body into a powder reservoir 3 and a powder puff compartment 4. The powder reservoir 3 is adapted to receive a semi-permanent cover 5 which may be attached by screw threads.

The powder puff compartment is closed by a lid 6 which is preferably hinged thereto. More specifically the lid 6 is provided with a pair of depending hinge lugs 7 which fit into recesses 8 formed in the walls of the body 1. A transversely extending hinge pin 9 secures the lid 6 to the body 1. At the side of the body 1 opposite from the hinge lugs 7 the body is provided with a recess 10 which receives a pivotally mounted latch 11, the free end of which is directed upwardly. Interlocking elements 12 are provided at the extremity of the latch 10 and under the corresponding portion of the lid 6 to secure the lid in a closed position. The interlocking elements are so arranged that they disengage when the free end of the latch is pressed inward. A spring 13 normally holds the latch in an outer latching position.

The lid 6 is preferably formed of transparent plastic material and may be in the form of a lens. Secured to the underside of the lid is a double-sided mirror 14, the upper side of which when viewed through the lid produces a magnified image.

The side of the partition 2 confronting the powder puff compartment slopes downwardly toward one margin and this margin is provided with a depression 15. Within the depression there is a perforated area 16 communicating with the powder reservoir 3. The normally underside of the partition 2 is provided with a boss 17 having a transverse recess 18 coinciding with and exposing the perforated area 16. Formed in the boss 17 and extending through the wall of body 1 is a horizontal slot 19 which is interrupted by the recess 18. The slot 19 receives a slide bar 20 having a perforated area 21, the perforations of which are movable into and out of registration with the perforations in the perforated area 16. A spring 22 is interposed between the inner end of the slide bar 20 and its slot 19 to urge the slide bar outwardly. The extremity of the slide bar protrudes from the body 1 so that it may be conveniently engaged.

The body 1 is provided with a vertical passageway 23 which intersects the outer portion of the slot 19. The passageway below the slot 19 is relatively wide but above the slot 19 divides to form two legs. The passageway 23 receives a U-shaped valve locking member 24 shown best in Figure 9. The cross portion of the locking member fits within the bottom portion of the passageway 23, whereas the legs of the locking member extend into the divided portion of the vertical passageway. The slide bar 20 is provided with paired openings which admit the legs of the locking member, and the underside of the slide bar between the openings 25 is provided with a recess 26 which accommodates the cross portion of the locking member. A spring 27 urges the locking member upwardly so that the cross portion enters the recess 26 and normally locks the slide bar in a position in which the perforations 16 and 21 are out of registry. The upper extremities of the locking member 24 protrude from the upper side of the body 1 so as to be engaged by the lid 6 when the lid is closed. When so engaged, the locking member releases the slide bar for operation.

The powder puff compartment 4 is adapted to receive a powder puff 28 which is preferably so arranged as to have an applicator portion 29 corresponding to and fitting in the depression 15.

Operation of my powder puff container is as follows: When the container is closed, as shown in Figure 3, the container may be inverted so that the powder puff compartment 4 is lowermost. The slide bar 20 is then reciprocated, and the container shaken to sift a charge of face powder onto the applicator portion of the powder puff. The container is then righted and the lid open for use of the powder puff. Should the container be dropped when the lid is open, no additional powder can pass from the powder reservoir into the powder puff compartment and spill. Also, should the container, while closed, be dropped in such a manner as to open the lid, the slide bar is automatically locked preventing the spillage of any appreciable quantity of powder.

Having fully described my invention, it is to be understood that I do not wish to be limited to the details herein set forth, but my invention is of the full scope of the appended claims.

I claim:

1. A face powder container, comprising: container means defining a powder puff compartment and a face powder reservoir separated by a partition, said partition having a ported area; a cover for said compartment; a valve means operable from the exterior of said means for passing face powder from said reservoir to said compartment; and means responsive to movement of said cover to lock said valve means against operation when said cover is open and permit said valve means to operate when said cover is closed.

2. A face powder container, comprising: container means defining a powder puff compartment and a face powder reservoir separated by a partition, said partition having a ported area; a cover for said compartment; a slide valve mounted in said partition and having an operating end protruding from said container means, and a ported area movable into and out of registry with the ported area of said partition; and a locking device for said slide valve mounted in a wall of said container means and operatively associated with said cover to lock said slide valve in a closed position when said cover is open and to free said slide valve when said cover is closed.

3. A face powder container, comprising: a molded body member having cavities in its upper and lower sides separated by a partition to provide a powder reservoir and a powder puff compartment; a semipermanent cover for said powder reservoir to permit periodic filling; a readily openable cover for said powder puff compartment; a valve incorporating said partition and including a slide member, there being registerable ports in said partition and slide member; and a locking means mounted in said body member and operatively associated with said cover to lock the slide member in a closed position when said cover is open and to free said slide member when said cover is closed whereby powder may be transferred to said powder puff compartment when said cover is closed but not when said cover is opened.

4. A face powder container, comprising: a body structure defining a powder reservoir and a powder puff compartment separated by a partition; a semipermanent cover for said powder reservoir; a hinged cover for said powder puff compartment; a slide member fitted in said partition and having an operating end protruding from said body structure, said slide member and partition having registerable ported areas for transfer of face powder from said reservoir to said compartment; yieldable means normally holding said ported areas out of registry; and a lock member mounted in said body structure for movement transversely to said slide member and having an end engageable with said hinged cover whereby when said cover is open said slide member is locked in an inoperative position with said ported areas out of registry, and when said cover is closed said slide member is free whereby powder cannot be transferred when said hinged cover is opened.

5. A face powder container, comprising: a body structure defining a powder puff compartment and a powder reservoir separated by a partition, the wall of said partition facing said compartment sloping toward one side of said body structure and a ported depression in the lower portion of said partition; a hinged cover for said powder puff compartment; a slide member fitted in said partition and having a ported area cooperating with said ported depression to transfer powder from said powder reservoir to a powder puff disposed in said depression; and a lock member mounted in said body structure for movement transversely to said slide member and having an end engageable with said hinged cover whereby when said cover is open said slide member is locked in an inoperative position with said ported areas out of registry, and when said cover is closed said slide member is free whereby powder cannot be transferred when said hinged cover is opened.

LYNN BERING.

No references cited.